Figure 1:
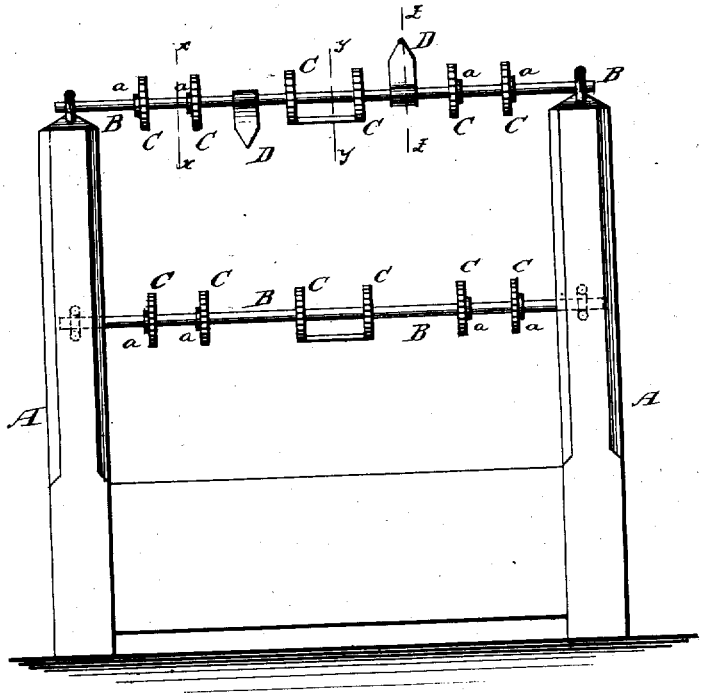
Figure 2:
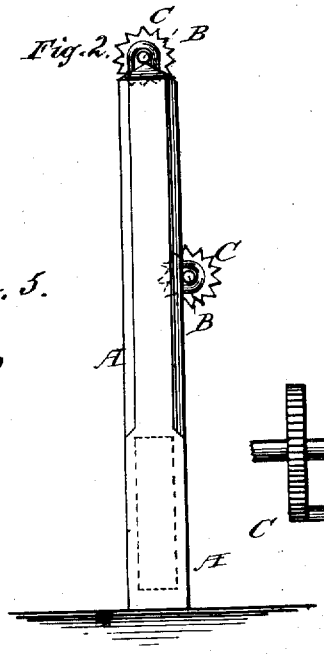
Figure 3:
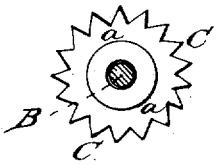
Figure 4:
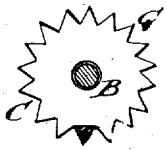
Figure 5:
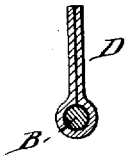
Figure 6:
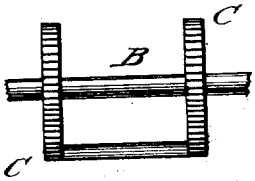

W. D. HUNT.

WIRE-FENCE.

Reissued March 7, 1876.

No. 6,976.

WITNESSES:

P. C. Dieterich

W. B. McArthur

INVENTOR:

Wm. D. Hunt per

C. H. Watson

ATTORNEY.

UNITED STATES PATENT OFFICE.

WILLIAM D. HUNT, OF SCOTT, NEW YORK, ASSIGNOR TO CHARLES KENNEDY, OF AURORA, ILLINOIS.

IMPROVEMENT IN WIRE FENCES.

Specification forming part of Letters Patent No. 67,117, dated July 23, 1867; Reissue No. 6,976, dated March 7, 1876; application filed June 2, 1875.

*To all whom it may concern:*

Be it known that I, WILLIAM D. HUNT, of Scott, in the county of Cortland and State of New York, have invented certain new and useful Improvements in Fences; and I do hereby declare that the following is a full, clear, and exact description thereof, that will enable others skilled in the art to which it appertains to make and use the same, reference being had to the accompanying drawings, and to the letters of reference marked thereon, which form a part of this specification.

In the drawings, A A represent the fence-posts; B B, wires, which run from one post to another to form the panels of fence.

This is simply a wire fence composed of any suitable number of wires; but for general purposes I think two will be sufficient.

C C represent a series of small spur-wheels, their spurs being sharpened, so as to prick readily. These wheels are provided at their centers with openings, through which the wire passes. D represents single spurs secured to the wires. The spur-wheels may fit the wire loosely, so as to revolve easily upon it; or they may be kept in their places and at suitable distances apart by means of flanges *a* or otherwise. These spurs can be made of refuse sheet metal by dies, and very cheaply.

By providing the wires with sharp spurs animals are deterred from pushing against the fence or attempting to break over it.

Having thus fully described my invention, what I claim as new, and desire to secure by Letters Patent, is as follows:

A fence-wire provided with spurs, for the purpose specified.

WM. D. HUNT.

Witnesses:
FRANK PLACE,
H. J. HARRINGTON.